United States Patent
Abotabl et al.

(10) Patent No.: US 12,501,415 B2
(45) Date of Patent: Dec. 16, 2025

(54) DEFAULT RESOURCE BANDWIDTH AND INACTIVITY TIMER

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/995,373

(22) PCT Filed: Nov. 23, 2020

(86) PCT No.: PCT/US2020/061844
§ 371 (c)(1),
(2) Date: Oct. 3, 2022

(87) PCT Pub. No.: WO2021/242300
PCT Pub. Date: Dec. 2, 2021

(65) Prior Publication Data
US 2023/0164753 A1    May 25, 2023

(30) Foreign Application Priority Data
May 25, 2020   (GR) ............................... 20200100279

(51) Int. Cl.
*H04W 72/00*    (2023.01)
*H04W 72/0453*    (2023.01)

(52) U.S. Cl.
CPC ............................... *H04W 72/0453* (2013.01)

(58) Field of Classification Search
None
See application file for complete search history.

(56) References Cited

U.S. PATENT DOCUMENTS

2019/0132110 A1    5/2019  Zhou et al.
2019/0215900 A1    7/2019  Pan et al.
(Continued)

FOREIGN PATENT DOCUMENTS

CN         110324890 A       10/2019
WO    WO-2019137340 A1        7/2019
(Continued)

OTHER PUBLICATIONS

Huawei et al., "Bandwidth Part Activation and Adaptation", 3GPP TSG RAN WG1 Meeting #91, R1-1719828, Reno, USA, Nov. 27-Dec. 1, 2017, 6 Pages, XP051369551, Nov. 18, 2017, Retrieved from the Internet: URL: http://www.3gpp.org/ftp/tsg%5Fran/WG1%5FRL1/TSGR1%5F91/Docs/.
(Continued)

*Primary Examiner* — Brandon M Renner
(74) *Attorney, Agent, or Firm* — Harrity & Harrity, LLP (57) ABSTRACT

Various aspects of the present disclosure generally relate to wireless communication. In some aspects, a user equipment may communicate using an initial resource bandwidth as an active bandwidth, wherein the initial resource bandwidth comprises at least a first portion of a bandwidth part (BWP); and switch, based at least in part on a timer expiry, to a default resource bandwidth as the active bandwidth, wherein the default resource bandwidth comprises at least a second portion of the BWP. Numerous other aspects are provided.

30 Claims, 8 Drawing Sheets

(56) References Cited

U.S. PATENT DOCUMENTS

| | | | | |
|---|---|---|---|---|
| 2020/0059345 | A1* | 2/2020 | Pelletier | H04B 7/00 |
| 2020/0204333 | A1* | 6/2020 | Agiwal | H04L 5/0098 |
| 2020/0266958 | A1* | 8/2020 | Liu | H04W 16/12 |
| 2020/0404690 | A1* | 12/2020 | Lee | H04L 5/005 |
| 2021/0167930 | A1* | 6/2021 | Jeon | H04L 27/2607 |
| 2021/0235440 | A1* | 7/2021 | Liang | H04W 72/0453 |
| 2022/0052828 | A1* | 2/2022 | Yiu | H04W 48/16 |
| 2023/0171075 | A1* | 6/2023 | Hui | H04L 5/0098 |
| | | | | 370/329 |

FOREIGN PATENT DOCUMENTS

| | | | | |
|---|---|---|---|---|
| WO | 2019242570 A1 | 12/2019 | | |
| WO | WO-2020159222 A1 * | 8/2020 | | H04W 72/20 |
| WO | WO-2020181475 A1 * | 9/2020 | | H04W 72/04 |

OTHER PUBLICATIONS

Interdigital Inc: "Timer-Based Change to Default Bandwidth Part", 3GPP Draft, 3GPP TSG-RAN WG2 #99bis, R2-1710663, (R15 NR WI AI103110 Timer BWPCH TP), 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017 (Oct. 8, 2017), XP051342693, 5 Pages, the whole document.
International Search Report and Written Opinion—PCT/US2020/061844—ISA/EPO—Mar. 12, 2021.

* cited by examiner

DEFAULT RESOURCE BANDWIDTH AND INACTIVITY TIMER

CROSS-REFERENCE TO RELATED APPLICATIONS

This Patent Application is a 371 national stage of PCT Application No. PCT/US2020/061844 filed on Nov. 23, 2020, entitled "DEFAULT RESOURCE BANDWIDTH AND INACTIVITY TIMER," which claims priority to Greece Patent Application Serial No. 20200100279, filed on May 25, 2020, entitled "DEFAULT RESOURCE BANDWIDTH AND INACTIVITY TIMER," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for a default resource bandwidth and inactivity timer.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include communicating using an initial resource bandwidth as an active bandwidth, wherein the initial resource bandwidth comprises at least a first portion of a bandwidth part (BWP); and switching, based at least in part on a timer expiry, to a default resource bandwidth as the active bandwidth, wherein the default resource bandwidth comprises at least a second portion of the BWP.

In some aspects, a UE for wireless communication may include a memory and one or more processors operatively coupled to the memory. The memory and the one or more processors may be configured to communicate using an initial resource bandwidth as an active bandwidth, wherein the initial resource bandwidth comprises at least a first portion of a BWP; and switch, based at least in part on a timer expiry, to a default resource bandwidth as the active bandwidth, wherein the default resource bandwidth comprises at least a second portion of the BWP.

In some aspects, a non-transitory computer-readable medium may store one or more instructions for wireless communication. The one or more instructions, when executed by one or more processors of a UE, may cause the one or more processors to communicate using an initial resource bandwidth as an active bandwidth, wherein the initial resource bandwidth comprises at least a first portion of a BWP; and switch, based at least in part on a timer expiry, to a default resource bandwidth as the active bandwidth, wherein the default resource bandwidth comprises at least a second portion of the BWP.

In some aspects, an apparatus for wireless communication may include means for communicating using an initial resource bandwidth as an active bandwidth, wherein the initial resource bandwidth comprises at least a first portion of a BWP; and means for switching, based at least in part on a timer expiry, to a default resource bandwidth as the active bandwidth, wherein the default resource bandwidth comprises at least a second portion of the BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
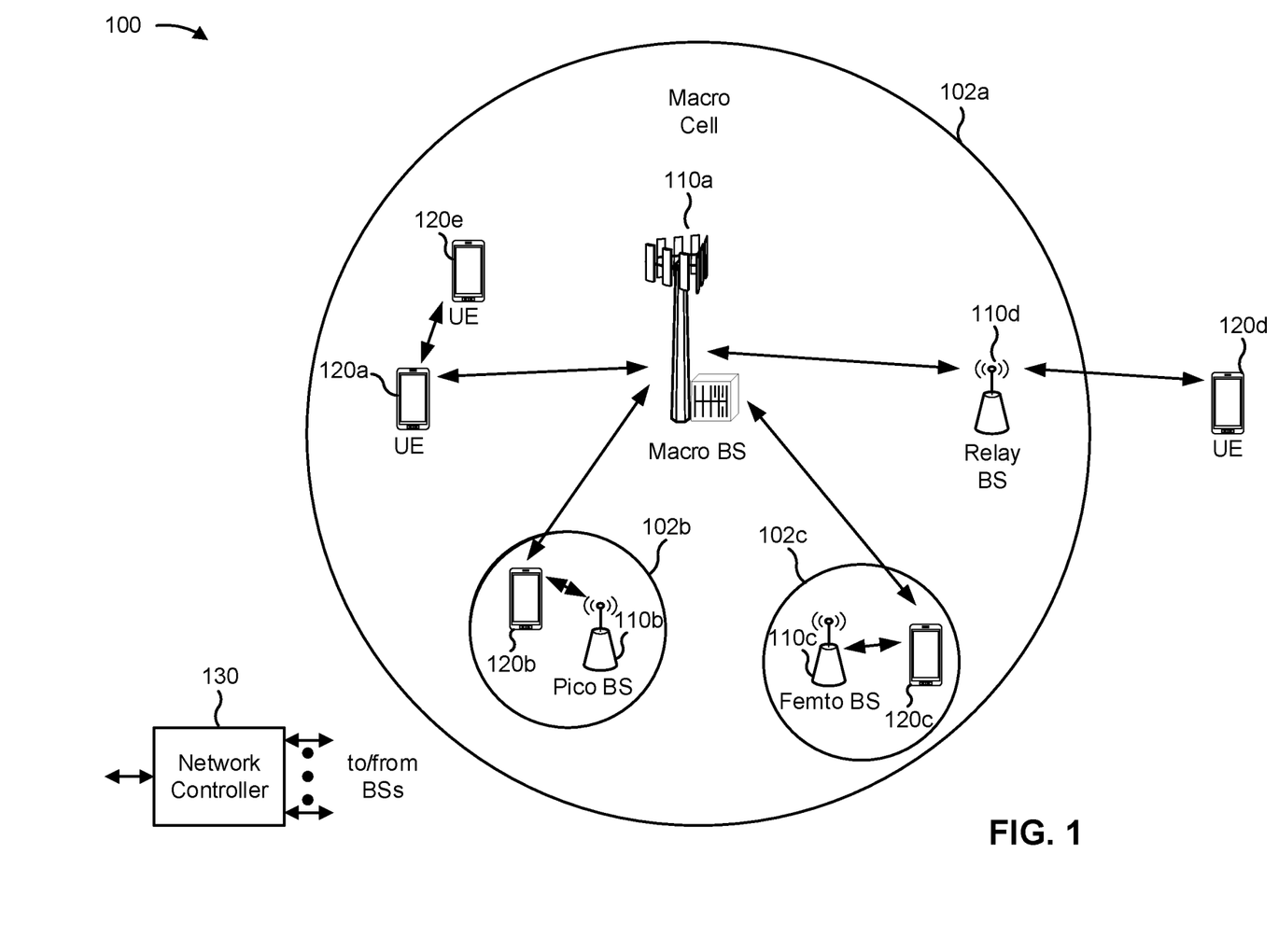
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
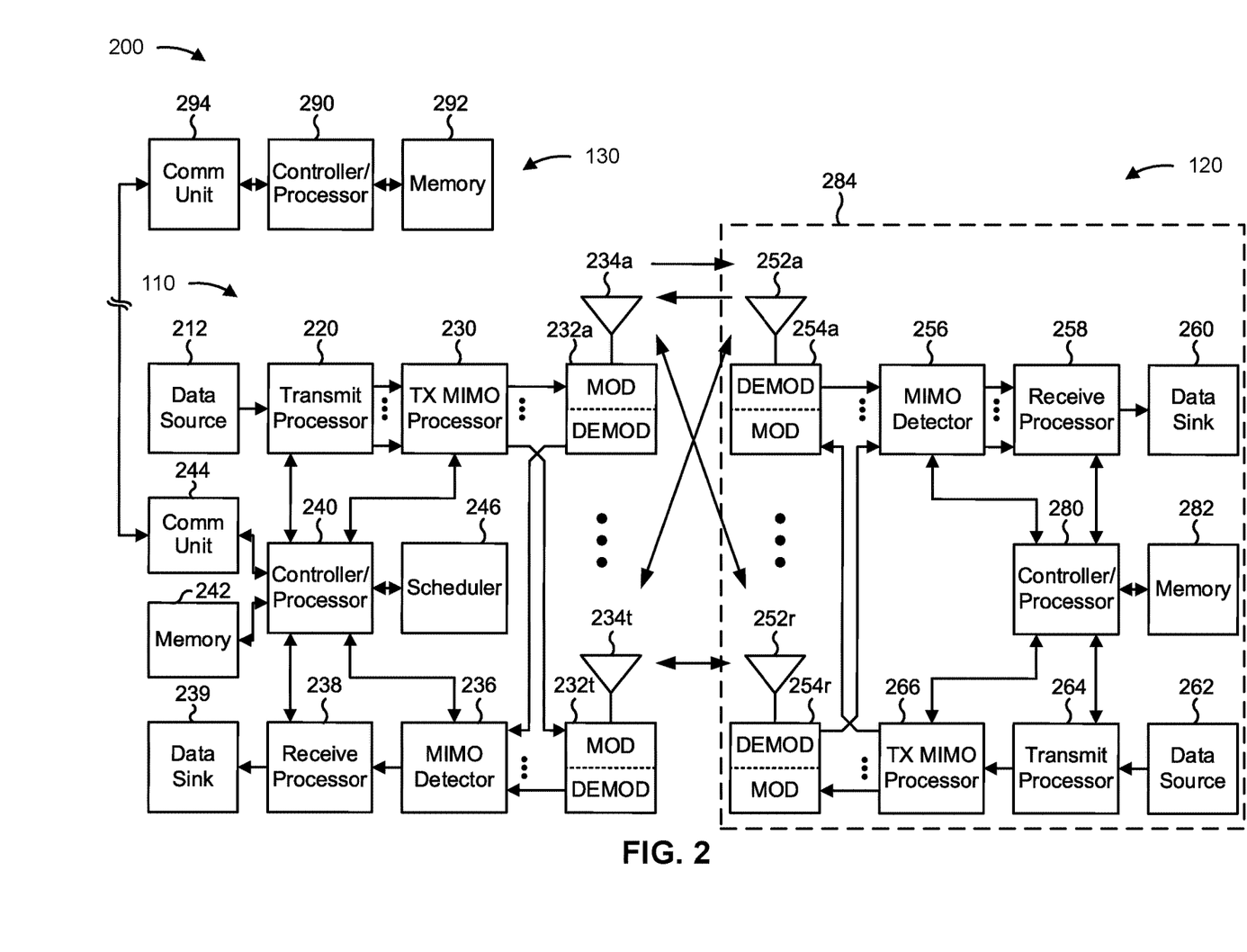
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with using a default resource bandwidth and inactivity timer, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, and/or other processes as described herein. In some aspects, executing instructions may include running the instructions, converting the instructions, compiling the instructions, interpreting the instructions, and/or the like.

In some aspects, UE 120 may include means for communicating using an initial resource bandwidth as an active bandwidth, wherein the initial resource bandwidth comprises at least a first portion of a bandwidth part (BWP), means for switching, based at least in part on a timer expiry, to a default resource bandwidth as the active bandwidth, wherein the default resource bandwidth comprises at least a second portion of the BWP, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
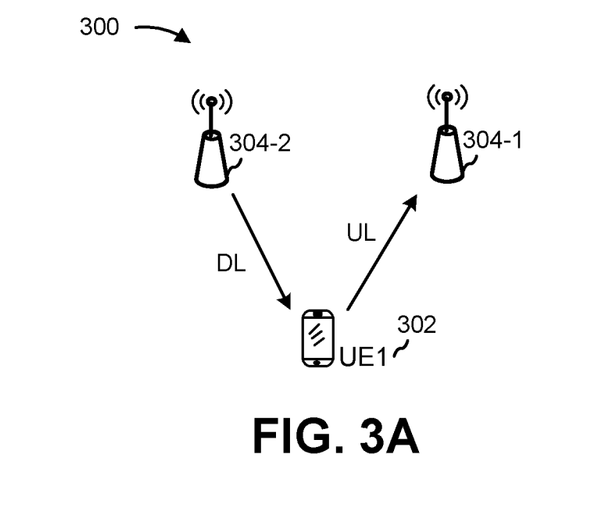
FIGS. 3A-3C are diagrams illustrating examples of full duplex communication, in accordance with various aspects of the present disclosure.
Figure 3B:
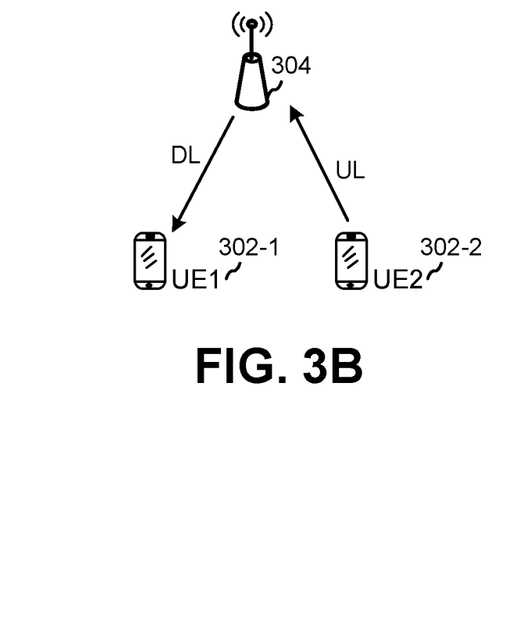
Figure 3C:
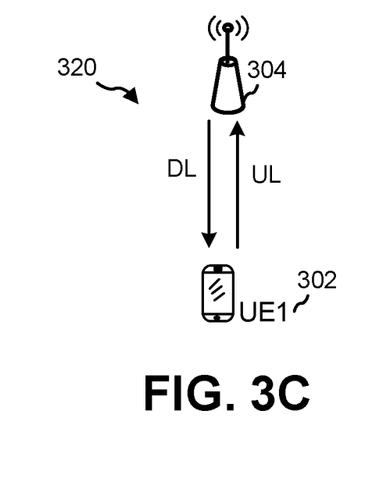

FIGS. 3A-3C are diagrams illustrating examples 300, 310, 320 of full duplex (FD) communication. The example 300 of FIG. 3A includes a UE1 302 and two base stations (e.g., TRPs) 304-1, 304-2, wherein the UE1 302 is sending uplink (UL) transmissions to base station 304-1 and is receiving downlink (DL) transmissions from base station 304-2. In the example 300 of FIG. 3A, FD is enabled for the UE1 302, but not for the base stations 304-1, 304-2. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

FD communication may include in-band full duplex (IBFD) communication, in which a device may transmit and receive on at least some of the same time and frequency resources. In IBFD, UL and DL resources may partially overlap or full overlap. FD communication may include sub-band Frequency Division Duplex (FDD) (which may be referred to as "flexible duplex"). In flexible duplex, the device may transmit and receive using the same time resource, but different frequency resources. The DL frequency resource may be separated from the UL frequency resource by a guard band. The guard band is typically small, spanning a small number of resource blocks, and thus allows some self-interference between the UL and DL signals.

FD communication may be conditional on a beam separation of the UL beam and DL beam at the respective antenna panels. Utilizing FD communication may provide a reduction in latency, such that it may be possible to receive a DL signal in UL-only slots, which may enable latency reduction. In addition, FD communication may enhance spectrum efficiency per cell or per UE and may allow for a more efficient utilization of resources. Beam separation of the UL and DL beams assists in limiting or reducing self-interference that may occur during FD communication. Selecting UL and DL beams that are on different antenna panels may minimize self-interference. Determining the UL and DL beams that are separated on their respective antenna panels may provide a reliable FD communication by facilitating selection of beam pairs that minimize or reduce self-interference.

As indicated above, FIGS. 3A-3C are provided as one or more examples. Other examples may differ from what is described with regard to FIGS. 3A-3C.

Figure 4:
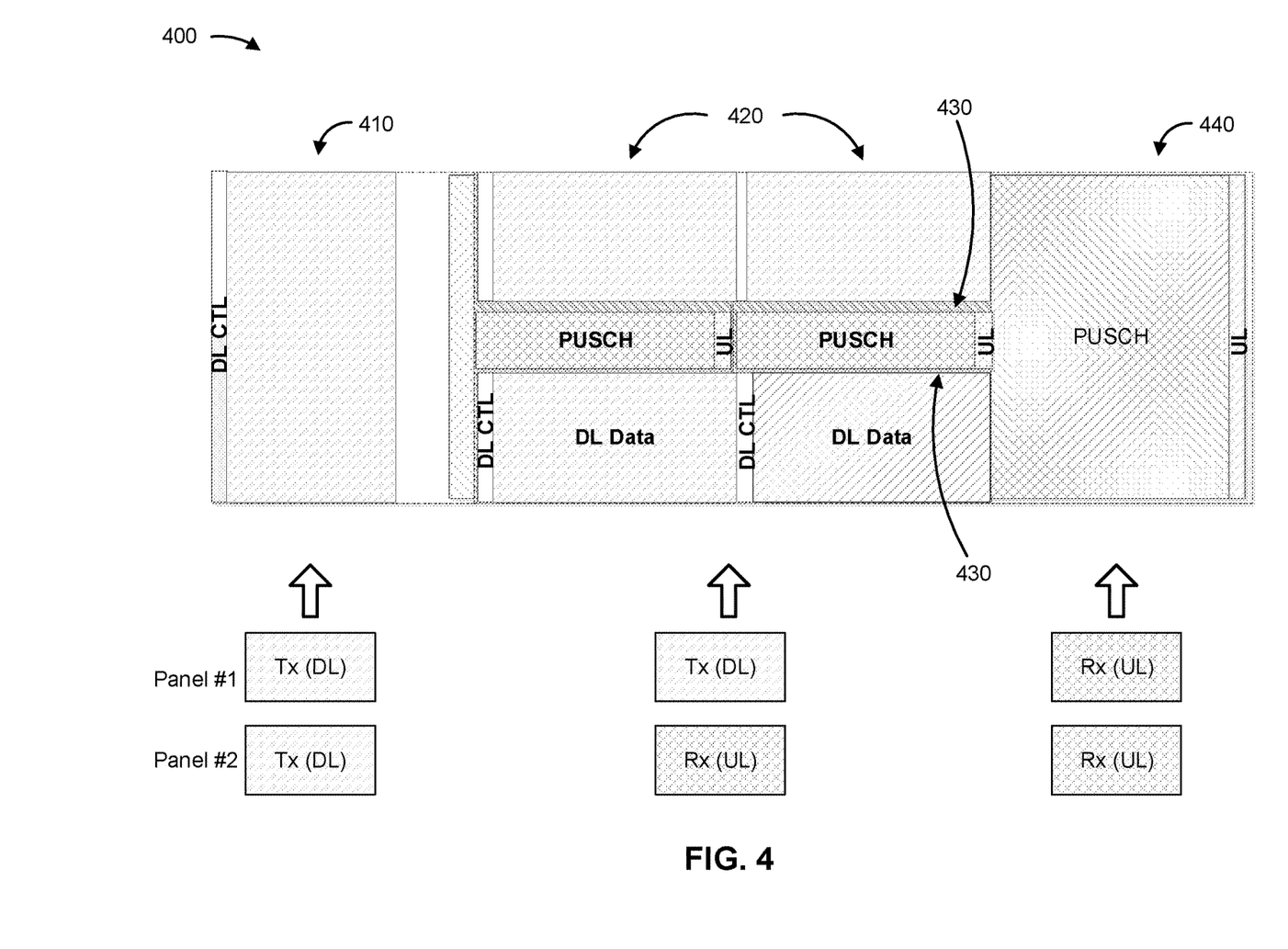
FIG. 4 is a diagram illustrating an example of frequency resource allocation for full duplex communication, in accordance with various aspects of the present disclosure.

FIG. 4 is a diagram illustrating an example 400 of frequency resource allocation for full duplex communication, in accordance with various aspects of the present disclosure. As shown, a device may include a first panel (shown as panel 1) and a second panel (shown as panel 2). The panels illustrated in FIG. 4 are associated with a base station, but similar concepts apply to panels associated with a UE.

Panel 1 may be used for DL transmission (shown as "Tx") at both edges of the band. Panel 2 may be used for UL reception (shown as "Rx") in the middle of the band. As shown by reference number 410, both panels may be used for DL Tx during a first slot. As shown by reference number 420, during a second slot and a third slot, Panel 1 may be used for DL Tx and Panel 2 may be used for UL Rx. Sub-band full duplex may be used so that the DL Tx is in a different portion of the band than the UL Rx, as shown. A guard band 430 may be disposed between the DL Tx resource and the UL Rx resource. The band 410 may be divided into one or more bandwidth parts (BWPs). As shown by reference number 440, both panels may be used for UL Rx during a fourth slot.

In some cases, the usable bandwidth within a BWP may be compromised because of the UL band, the guard band, and/or the like. To configure multiple frequency resources that can be usable in situations such as this, resource bandwidths may be used. A resource bandwidth is a bandwidth that comprises at least a portion of a BWP. A master resource bandwidth is a resource bandwidth of a BWP to which a device switches as an active bandwidth upon receiving a BWP switching trigger. There is no mechanism for automatic switching between resource bandwidths. Thus, a device will continue to use a current resource bandwidth as an active bandwidth until an instruction to switch to a different resource bandwidth is received. This may result in consumption of unnecessary resources associated with the active bandwidth, unnecessary signaling overhead, and/or the like.

Some techniques and apparatuses described herein enable automatic switching from a current resource bandwidth to a default resource bandwidth based at least in part on expiry of an inactivity timer. As a result, bandwidth resources may be preserved, signaling overhead may be reduced, and/or the like. In some aspects, multiple default resource bandwidths may be configured according to a default resource bandwidth order. As a result, a device may switch from one default bandwidth to another based at least in part on an inactivity timer expiry, which may facilitate more flexibility in frequency resource allocation.

As indicated above, FIG. 4 is provided as one or more examples. Other examples may differ from what is described with regard to FIG. 4.

Figure 5:
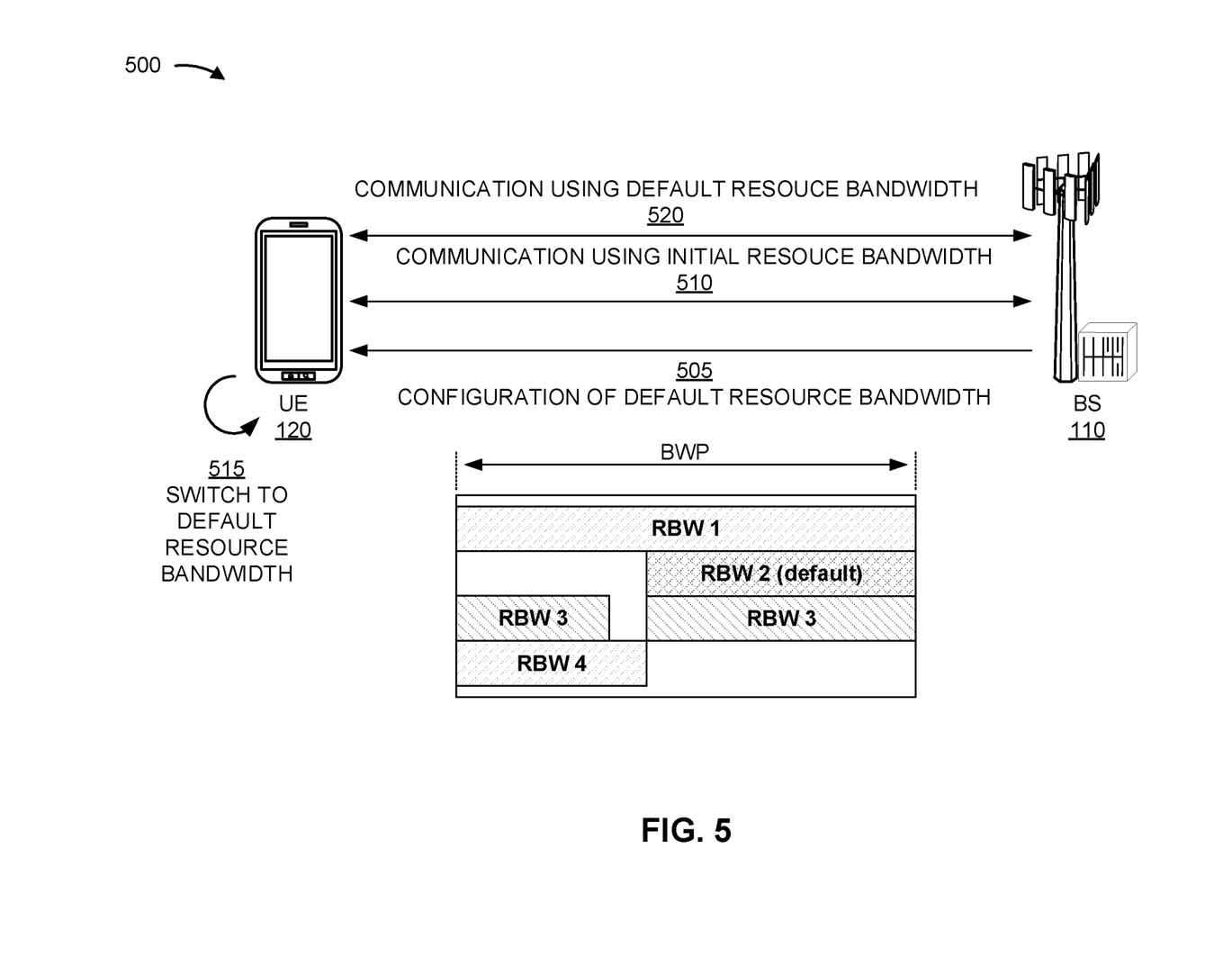
FIG. 5 is a diagram illustrating an example of using a default resource bandwidth and inactivity timer, in accordance with various aspects of the present disclosure.

FIG. 5 is a diagram illustrating an example 500 associated with using a default resource bandwidth and inactivity timer, in accordance with various aspects of the present disclosure. As shown in FIG. 5, example 500 includes a base station 110 and a UE 120.

As shown by reference number 505, the base station 110 may transmit, and the UE 120 may receive, a configuration of a default resource bandwidth (shown as "RBW 2"). In some aspects, the configuration may be carried in a radio resource control (RRC) message. In some aspects, for example, as shown, the base station 110 may configure a number of resource bandwidths (shown as "RBW 1," "RBW 2," "RBW 3," and "RBW 4"). In some aspects, the resource bandwidths may correspond to a particular BWP, as shown. As shown, a resource bandwidth (e.g., RBW 1, and/or the like) may comprise the entire BWP. In some aspects, a resource bandwidth (e.g., RBW 2, RBW 3, RBW 4, and/or the like) may comprise a portion of the BWP. In some aspects, a resource bandwidth (e.g., RBW 3, and/or the like) may be disjoint, comprising more than one portion of the BWP.

In some aspects, any one or more of the resource bandwidths may be configured as a default resource bandwidth. In some aspects, the default resource bandwidth may be designated for use in a half-duplex operation. In some aspects, the base station 110 may configure additional resource bandwidths (including one or more additional default resource bandwidths) associated with one or more additional BWPs. In some aspects, the additional resource bandwidths may be the same resource bandwidths that are shown in FIG. 5, different resource bandwidths than those shown in FIG. 5, and/or the like.

In some aspects, the base station 110 may transmit, and the UE 120 may receive, a configuration of an inactivity timer. In some aspects, the configuration of the inactivity timer may be transmitted with the configuration of the default resource bandwidth. In some aspects, the configuration of the inactivity timer may be carried in an RRC message. In some aspects, the inactivity timer may correspond to the BWP and at least one additional BWP. In some aspects, the inactivity timer may correspond to the BWP, and at least one additional inactivity timer may correspond to at least one additional BWP. In some aspects, as described below in connection with FIG. 6, more than one inactivity timer may be configured.

In some aspects, the inactivity timer may correspond to the initial resource bandwidth. In some aspects, the inactivity timer may be based at least in part on an additional inactivity timer corresponding to the BWP. In some aspects, the inactivity timer may be shorter in duration than the additional inactivity timer. In some aspects, the inactivity timer may be greater than or equal to the additional inactivity timer.

As shown by reference number 510, the UE 120 and base station 110 may communicate using an initial resource bandwidth as an active bandwidth. In some aspects, for example, the initial resource bandwidth may be RBW 1, RBW3, or RBW 4. In some aspects, the initial resource bandwidth may include at least a first portion of the BWP. As shown by reference number 515, the UE 110 may switch, based at least in part on a timer expiry, to the default resource bandwidth (RBW 2) as the active bandwidth. In some aspects, the default resource bandwidth may include at least a second portion of the BWP. In some aspects, the timer expiry may include an expiry of an inactivity timer. As shown by reference number 520, the UE 120 and the base station 110 may communicate using the default resource bandwidth.

Aspects of the techniques and apparatuses described above enable automatic switching from a current resource bandwidth to a default resource bandwidth based at least in part on expiry of an inactivity timer. As a result, bandwidth resources may be preserved, signaling overhead may be reduced, and/or the like.

As indicated above, FIG. 5 is provided as an example. Other examples may differ from what is described with respect to FIG. 5.

Figure 6:
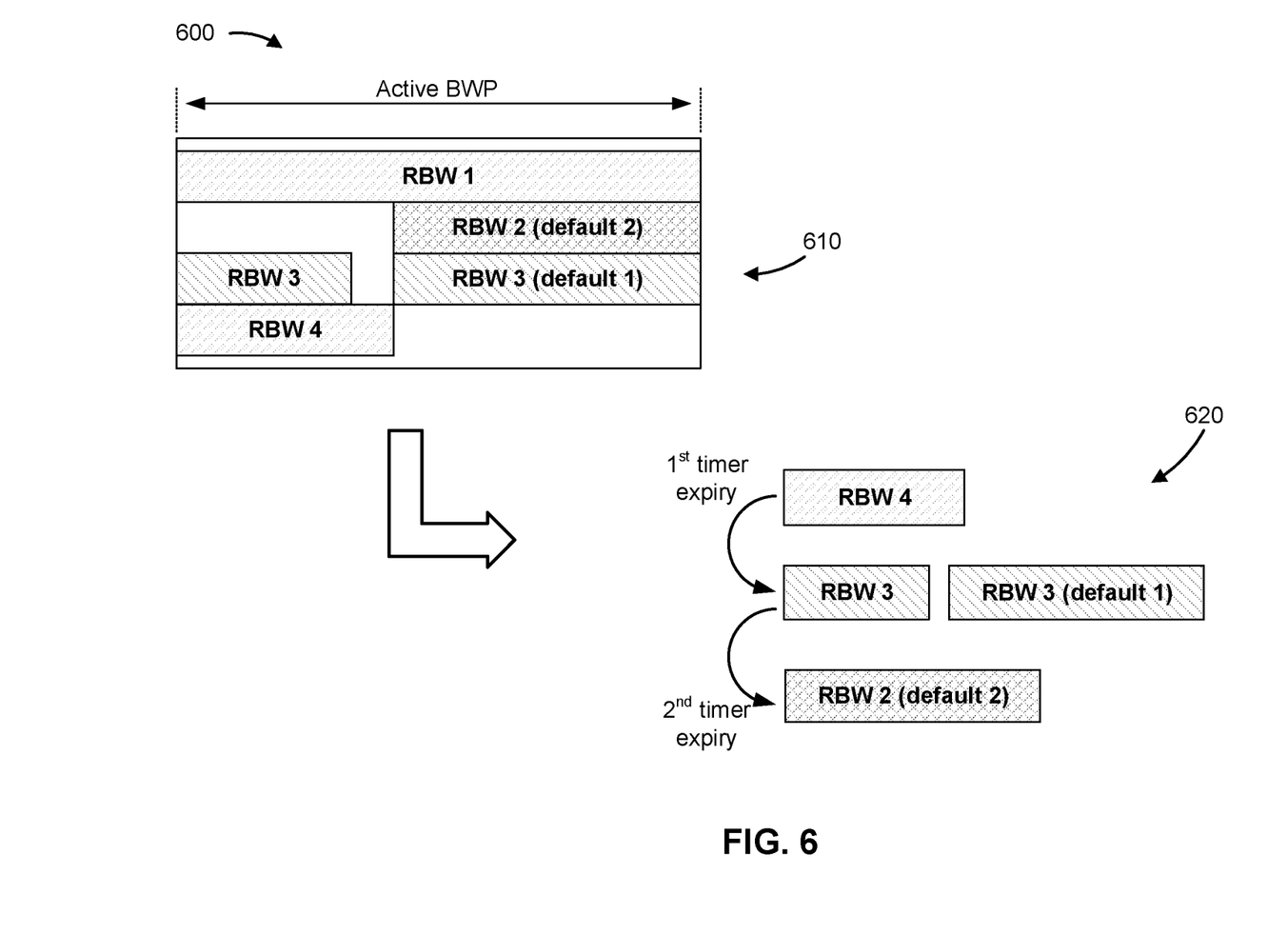
FIG. 6 is a diagram illustrating an example of using multiple default resource bandwidths and inactivity timers, in accordance with various aspects of the present disclosure.

FIG. 6 is a diagram illustrating an example 600 of using multiple default resource bandwidths and inactivity timers, in accordance with various aspects of the present disclosure. As shown, a BWP may be configured with a number of resource bandwidths (shown as "RBW 1," "RBW 2," "RBW 3," and "RBW 4").

As shown by reference number 610, the BWP may be configured with a plurality of default resource bandwidths (RBW2 and RBW 3). In some aspects, the configuration may indicate a default resource bandwidth order associated with the plurality of default bandwidths. In some aspects, the default resource bandwidth order may indicate an order according to which a UE (e.g., the UE 120) will switch to each of the default resource bandwidths. In some aspects, the default bandwidths and/or the default resource bandwidth order may be configured using an RRC message.

As shown by reference number 620, a configured default resource bandwidth order may indicate an order in which a UE may switch to more than one default resource bandwidth, where the switches are based at least in part on timer expiries. As shown, for example, a current active resource bandwidth may be RBW 4. Upon expiry of a first inactivity timer, the UE switches from RBW 4 to a first default resource bandwidth (RBW 3) as the active resource bandwidth. Upon expiry of a second inactivity timer, the UE switches from RBW 3 to a second default resource bandwidth (RBW 2). Any number of default resource bandwidths may be configured, along with any number of timer expiries.

In some aspects, a single timer may be associated with both default resource bandwidths, an active resource bandwidth of the BWP, and/or the like. For example, in some aspects, the first timer expiry may include a first expiry of an inactivity timer corresponding to an active resource bandwidth (resulting in the UE switching from the active bandwidth to a first default resource bandwidth as the active bandwidth) and the additional timer expiry may include a second expiry of the same inactivity timer (resulting in the UE switching from the first default resource bandwidth as the active bandwidth to a second default resource bandwidth as the active bandwidth). In some aspects, the inactivity timer may be reset based at least in part on the UE switching to the next default resource bandwidth as the active bandwidth.

In some aspects, each timer expiry may include an expiry of a different timer. In some aspects, each of a plurality of timers may be associated with a different resource bandwidth. For example, in some aspects, the first timer expiry may include an expiry of a first resource bandwidth inactivity timer corresponding to RBW 4 and the second timer expiry may include an expiry of a second resource bandwidth inactivity timer corresponding to the default resource bandwidth.

In this way, a UE may switch from one default bandwidth to another default resource bandwidth based at least in part on inactivity timer expiry, which may facilitate more flexibility in frequency resource allocation.

As indicated above, FIG. 6 is provided as an example. Other examples may differ from what is described with respect to FIG. 6.

Figure 7:
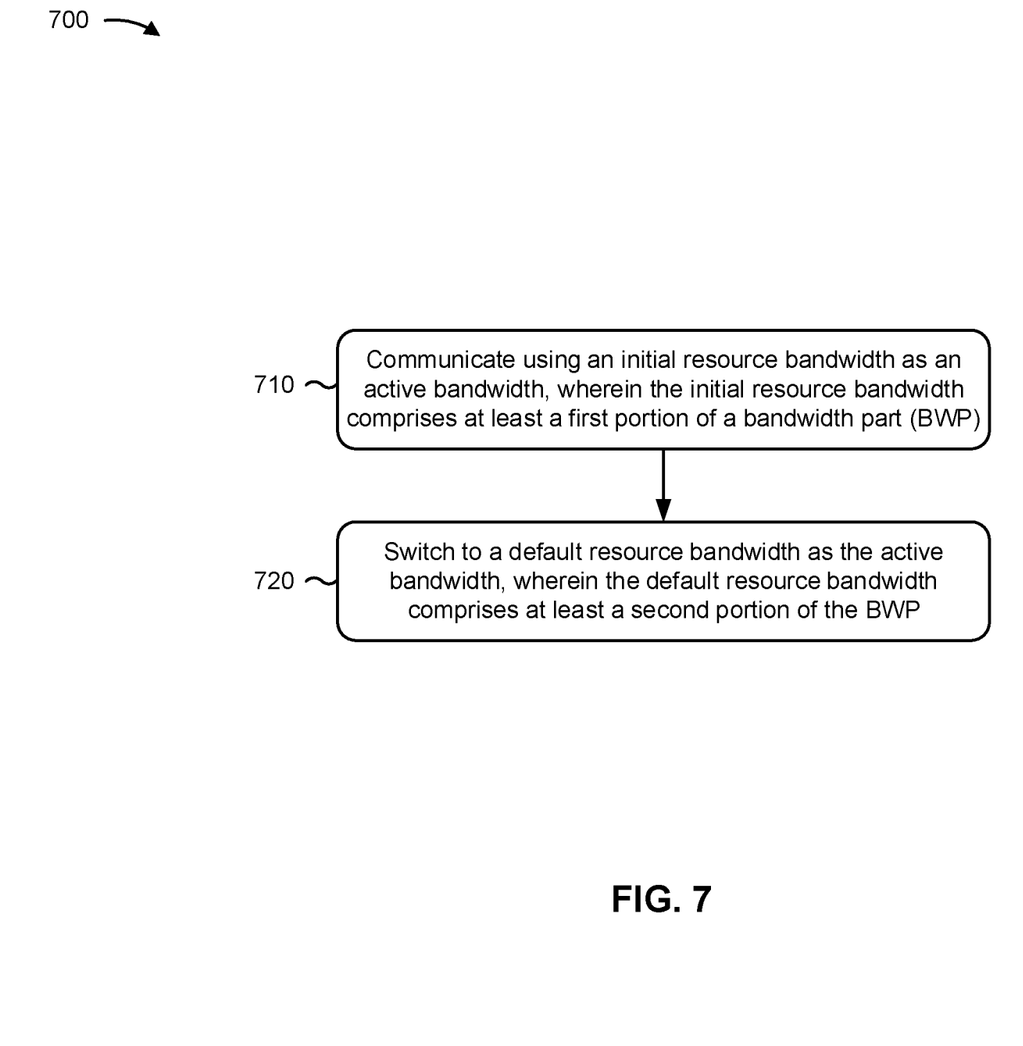
FIG. 7 is a diagram illustrating an example process associated with using a default resource bandwidth and inactivity timer, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with using a default resource bandwidth and inactivity timer.

As shown in FIG. 7, in some aspects, process 700 may include communicating using an initial resource bandwidth as an active bandwidth, wherein the initial resource bandwidth comprises at least a first portion of a BWP (block 710). For example, the UE (e.g., using receive processor 258, transmit processor 264, controller/processor 280, memory 282, and/or the like) may communicate using an initial resource bandwidth as an active bandwidth, as described above. In some aspects, the initial resource bandwidth comprises at least a first portion of a BWP, as described above in connection with FIGS. 5 and 6.

As further shown in FIG. 7, in some aspects, process 700 may include switching, based at least in part on a timer expiry, to a default resource bandwidth as the active bandwidth, wherein the default resource bandwidth comprises at least a second portion of the BWP (block 720). For example, the UE (e.g., using receive processor 258, transmit processor 264, controller/processor 280, memory 282, and/or the like) may switch, based at least in part on a timer expiry, to a default resource bandwidth as the active bandwidth, as described above. In some aspects, the default resource bandwidth comprises at least a second portion of the BWP, as described above in connection with FIGS. 5 and 6. In some aspects, the default resource bandwidth is designated for use in a half-duplex operation. In some aspects, the timer expiry comprises an expiry of an inactivity timer. In some aspects, the inactivity timer is used for the BWP, and the inactivity timer is used for at least one additional BWP. In some aspects, the inactivity timer is used for the BWP and at least one additional inactivity timer is used for at least one additional BWP. In some aspects, the inactivity timer corresponds to the initial resource bandwidth and is based at least in part on an additional inactivity timer, and the additional inactivity timer corresponds to the BWP. In some aspects, the inactivity timer is shorter in duration than the additional inactivity timer. In some aspects, the inactivity timer corresponds to the initial resource bandwidth, and an additional inactivity timer corresponds to the default resource bandwidth.

Process 700 may include additional aspects, such as any single aspect or any combination of aspects described below and/or in connection with one or more other processes described elsewhere herein.

In a first aspect, process 700 includes receiving a configuration of the default resource bandwidth in an RRC message.

In a second aspect, alone or in combination with the first aspect, process 700 includes receiving a configuration of the inactivity timer in an RRC message.

In a third aspect, alone or in combination with one or more of the first through second aspects, process 700 includes switching, based at least in part on an additional timer expiry, from the default resource bandwidth to an additional default resource bandwidth as the active bandwidth, wherein the additional default resource bandwidth comprises at least a third portion of the BWP.

In a fourth aspect, alone or in combination with one or more of the first through third aspects, the UE switches to the additional default resource bandwidth as the active bandwidth based at least in part on a default resource bandwidth order.

In a fifth aspect, alone or in combination with one or more of the first through fourth aspects, the timer expiry comprises a first expiry of an inactivity timer associated with the BWP, and the additional timer expiry comprises a second expiry of the inactivity timer associated with the BWP, where the inactivity timer is reset based at least in part on the UE switching to the default resource bandwidth as the active bandwidth.

In a sixth aspect, alone or in combination with one or more of the first through fifth aspects, the timer expiry comprises an expiry of a first resource bandwidth inactivity timer associated with the initial resource bandwidth, and the additional timer expiry comprises an expiry of a second resource bandwidth inactivity timer associated with the default resource bandwidth.

In a seventh aspect, alone or in combination with one or more of the first through sixth aspects, process 700 includes receiving a configuration of a default resource bandwidth order associated with a plurality of default bandwidths comprising the default bandwidth and at least one additional default bandwidth, where the default resource bandwidth order indicates an order according to which the UE will switch to the default resource bandwidth and the at least one additional bandwidth.

In an eighth aspect, alone or in combination with one or more of the first through seventh aspects, the configuration of the default resource bandwidth order is received in an RRC message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
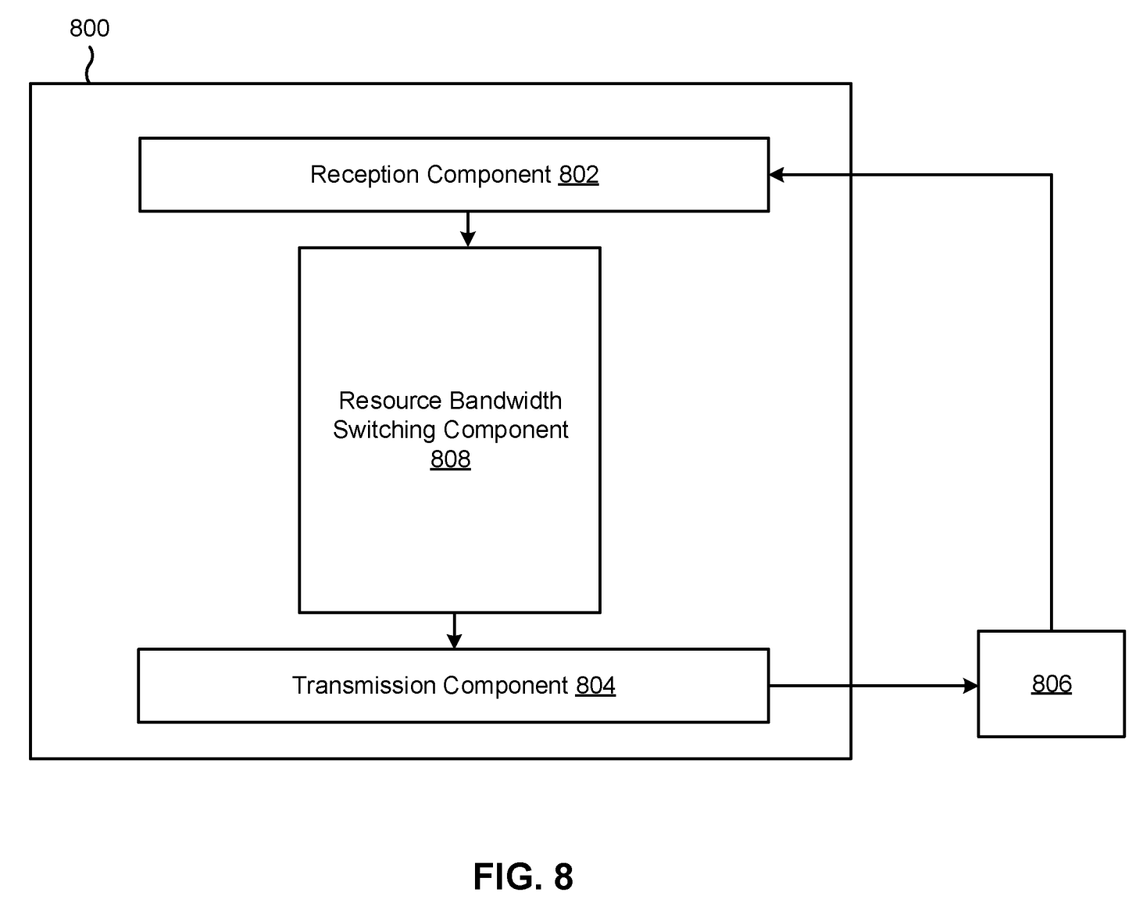
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 806 may include a resource bandwidth switching component 808, among other examples.

In some aspects, the apparatus 800 may be configured to perform one or more operations described herein in connection with FIGS. 5-6. Additionally or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 and/or the transmission component 804 may facilitate communication using an active bandwidth, where the active bandwidth comprises at least a portion of a BWP. The resource bandwidth switching component 808 may facilitate switching, based at least in part on a timer expiry, to a default resource bandwidth as the active bandwidth.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: communicating using an initial resource bandwidth as an active bandwidth, wherein the initial resource bandwidth comprises at least a first portion of a bandwidth part (BWP); and switching, based at least in part on a timer expiry, to a default resource bandwidth as the active bandwidth, wherein the default resource bandwidth comprises at least a second portion of the BWP.

Aspect 2: The method of aspect 1, further comprising receiving a configuration of the default resource bandwidth in a radio resource control message.

Aspect 3: The method of either of aspects 1 or 2, wherein the default resource bandwidth is designated for use in a half-duplex operation.

Aspect 4: The method of any of aspects 1-3, wherein the timer expiry comprises an expiry of an inactivity timer.

Aspect 5: The method of aspect 4, further comprising receiving a configuration of the inactivity timer in a radio resource control message.

Aspect 6: The method of either of aspects 4 or 5, wherein the inactivity timer is used for the BWP, and wherein the inactivity timer is used for at least one additional BWP.

Aspect 7: The method of aspect 4, wherein the inactivity timer is used for the BWP, and wherein at least one additional inactivity timer is used for at least one additional BWP.

Aspect 8: The method of any of aspects 4-7, wherein the inactivity timer corresponds to the active bandwidth.

Aspect 9: The method of aspect 8, wherein the inactivity timer is based at least in part on an additional inactivity timer, and wherein the additional inactivity timer corresponds to the BWP.

Aspect 10: The method of aspect 9, wherein the inactivity timer is shorter in duration than the additional inactivity timer.

Aspect 11: The method of aspect 4, wherein the inactivity timer corresponds to the initial resource bandwidth, and wherein an additional inactivity timer corresponds to the default resource bandwidth.

Aspect 12: The method of any of aspects 1-11, further comprising switching, based at least in part on an additional timer expiry, from the default resource bandwidth to an additional default resource bandwidth as the active bandwidth, wherein the additional default resource bandwidth comprises at least a third portion of the BWP.

Aspect 13: The method of aspect 12, wherein the UE switches to the additional default resource bandwidth as the active bandwidth based at least in part on a default resource bandwidth order.

Aspect 14: The method of either of aspects 12 or 13, wherein the timer expiry comprises a first expiry of an inactivity timer associated with the BWP, and wherein the additional timer expiry comprises a second expiry of the inactivity timer associated with the BWP, wherein the inactivity timer is reset based at least in part on the UE switching to the default resource bandwidth as the active bandwidth.

Aspect 15: The method of aspect 12, wherein the timer expiry comprises an expiry of a first resource bandwidth inactivity timer associated with the initial resource bandwidth, and wherein the additional timer expiry comprises an expiry of a second resource bandwidth inactivity timer associated with the default resource bandwidth.

Aspect 16: The method of any of aspects 1-15, further comprising receiving a configuration of a default resource bandwidth order associated with a plurality of default bandwidths comprising the default bandwidth and at least one additional default bandwidth, wherein the default resource bandwidth order indicates an order according to which the UE will switch to the default resource bandwidth and the at least one additional bandwidth.

Aspect 17: The method of aspect 16, wherein the configuration of the default resource bandwidth order is received in a radio resource control message.

Aspect 18: An apparatus for wireless communication at a device, comprising a processor; memory coupled with the processor; and instructions stored in the memory and executable by the processor to cause the apparatus to perform the method of one or more aspects of aspects 1-17.

Aspect 19: A device for wireless communication, comprising a memory and one or more processors coupled to the memory, the memory and the one or more processors configured to perform the method of one or more aspects of aspects 1-17.

Aspect 20: An apparatus for wireless communication, comprising at least one means for performing the method of one or more aspects of aspects 1-17.

Aspect 21: A non-transitory computer-readable medium storing code for wireless communication, the code comprising instructions executable by a processor to perform the method of one or more aspects of aspects 1-17.

Aspect 22: A non-transitory computer-readable medium storing a set of instructions for wireless communication, the set of instructions comprising one or more instructions that, when executed by one or more processors of a device, cause the device to perform the method of one or more aspects of aspects 1-17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   communicating using an initial resource bandwidth within a bandwidth part (BWP) as an active bandwidth, wherein the initial resource bandwidth comprises at least a first portion of the bandwidth part; and
   automatically switching, based at least in part on a timer expiry, to a default resource bandwidth within the BWP as the active bandwidth, wherein the default resource bandwidth comprises at least a second portion of the BWP.

2. The method of claim 1, wherein the timer expiry comprises an expiry of an inactivity timer, wherein the inactivity timer is used for the BWP, and wherein the inactivity timer is used for at least one additional BWP.

3. The method of claim 1, wherein the timer expiry comprises an expiry of an inactivity timer, wherein the inactivity timer is used for the BWP, and wherein at least one additional inactivity timer is used for at least one additional BWP.

4. The method of claim 1, wherein the timer expiry comprises an expiry of an inactivity timer, wherein the inactivity timer is based at least in part on an additional inactivity timer, wherein the additional inactivity timer corresponds to the BWP.

5. The method of claim 1, wherein the timer expiry comprises an expiry of an inactivity timer, wherein the inactivity timer corresponds to the initial resource bandwidth, and
   wherein an additional inactivity timer corresponds to the default resource bandwidth.

6. The method of claim 1, further comprising switching, based at least in part on an additional timer expiry, from the default resource bandwidth to an additional default resource bandwidth as the active bandwidth, wherein the additional default resource bandwidth comprises at least a third portion of the BWP.

7. The method of claim 6, wherein the UE switches to the additional default resource bandwidth as the active bandwidth based at least in part on a default resource bandwidth order.

8. The method of claim 6, wherein the timer expiry comprises a first expiry of an inactivity timer associated with the BWP, and
   wherein the additional timer expiry comprises a second expiry of the inactivity timer associated with the BWP, wherein the inactivity timer is reset based at least in part on the UE switching to the default resource bandwidth as the active bandwidth.

9. The method of claim 6, wherein the timer expiry comprises an expiry of a first resource bandwidth inactivity timer associated with the initial resource bandwidth, and
   wherein the additional timer expiry comprises an expiry of a second resource bandwidth inactivity timer associated with the default resource bandwidth.

10. The method of claim 1, further comprising receiving a radio resource control message that includes at least one of:
    a configuration of the default resource bandwidth,
    a configuration of an inactivity timer, or
    a configuration of a default resource bandwidth order.

11. A user equipment (UE) for wireless communication, comprising:
    memory; and
    one or more processors operatively coupled to the memory, the memory and the one or more processors configured to:
       communicate using an initial resource bandwidth within a bandwidth part (BWP) as an active bandwidth, wherein the initial resource bandwidth comprises at least a first portion of the bandwidth part; and
       automatically switch, based at least in part on a timer expiry, to a default resource bandwidth within the BWP as the active bandwidth, wherein the default resource bandwidth comprises at least a second portion of the BWP.

12. The UE of claim 11, wherein the timer expiry comprises an expiry of an inactivity timer, wherein the inactivity timer is used for the BWP, and wherein the inactivity timer is used for at least one additional BWP.

13. The UE of claim 11, wherein the timer expiry comprises an expiry of an inactivity timer, wherein the inactivity timer is used for the BWP, and wherein at least one additional inactivity timer is used for at least one additional BWP.

14. The UE of claim 11, wherein the timer expiry comprises an expiry of an inactivity timer, wherein the inactivity timer is based at least in part on an additional inactivity timer, wherein the additional inactivity timer corresponds to the BWP.

15. The UE of claim 11, wherein the timer expiry comprises an expiry of an inactivity timer, wherein the inactivity timer corresponds to the initial resource bandwidth, and
    wherein an additional inactivity timer corresponds to the default resource bandwidth.

16. The UE of claim 11, wherein the memory and the one or more processors are further configured to:
    switch, based at least in part on an additional timer expiry, from the default resource bandwidth to an additional default resource bandwidth as the active bandwidth, wherein the additional default resource bandwidth comprises at least a third portion of the BWP.

17. The UE of claim 16, wherein the UE switches to the additional default resource bandwidth as the active bandwidth based at least in part on a default resource bandwidth order.

18. The UE of claim 16, wherein the timer expiry comprises a first expiry of an inactivity timer associated with the BWP, and
   wherein the additional timer expiry comprises a second expiry of the inactivity timer associated with the BWP, wherein the inactivity timer is reset based at least in part on the UE switching to the default resource bandwidth as the active bandwidth.

19. The UE of claim 16, wherein the timer expiry comprises an expiry of a first resource bandwidth inactivity timer associated with the initial resource bandwidth, and
   wherein the additional timer expiry comprises an expiry of a second resource bandwidth inactivity timer associated with the default resource bandwidth.

20. The UE of claim 11, wherein the memory and the one or more processors are further configured to receive a radio resource control message comprising at least one of:
   a configuration of the default resource bandwidth,
   a configuration of an inactivity timer, or
   a configuration of a default resource bandwidth order.

21. A non-transitory computer-readable medium storing one or more instructions for wireless communication, the one or more instructions comprising:
   one or more instructions that, when executed by one or more processors of a user equipment, cause the one or more processors to:
      communicate using an initial resource bandwidth within a bandwidth part (BWP) as an active bandwidth, wherein the initial resource bandwidth comprises at least a first portion of the bandwidth part; and
      automatically switch, based at least in part on a timer expiry, to a default resource bandwidth within the BWP as the active bandwidth, wherein the default resource bandwidth comprises at least a second portion of the BWP.

22. The non-transitory computer-readable medium of claim 21, wherein the timer expiry comprises an expiry of an inactivity timer, wherein the inactivity timer is used for the BWP, and wherein the inactivity timer is used for at least one additional BWP.

23. The non-transitory computer-readable medium of claim 21, wherein the timer expiry comprises an expiry of an inactivity timer, wherein the inactivity timer is used for the BWP and at least one additional inactivity timer is used for at least one additional BWP.

24. The non-transitory computer-readable medium of claim 21, wherein the timer expiry comprises an expiry of an inactivity timer, and wherein the inactivity timer corresponds to the initial resource bandwidth.

25. The non-transitory computer-readable medium of claim 21, wherein the timer expiry comprises an expiry of an inactivity timer, wherein the inactivity timer is based at least in part on an additional inactivity timer, wherein the additional inactivity timer corresponds to the BWP.

26. The non-transitory computer-readable medium of claim 21, wherein the timer expiry comprises an expiry of an inactivity timer, wherein the inactivity timer corresponds to the initial resource bandwidth, and
   wherein an additional inactivity timer corresponds to the default resource bandwidth.

27. The non-transitory computer-readable medium of claim 21, wherein the one or more instructions, when executed by the one or more processors, further cause the one or more processors to:
   switch, based at least in part on an additional timer expiry, from the default resource bandwidth to an additional default resource bandwidth as the active bandwidth, wherein the additional default resource bandwidth comprises at least a third portion of the BWP.

28. The non-transitory computer-readable medium of claim 27, wherein the UE switches to the additional default resource bandwidth as the active bandwidth based at least in part on a default resource bandwidth order,
   wherein the timer expiry comprises a first expiry of an inactivity timer associated with the BWP, and
   wherein the additional timer expiry comprises a second expiry of the inactivity timer associated with the BWP, wherein the inactivity timer is reset based at least in part on the UE switching to the default resource bandwidth as the active bandwidth.

29. The non-transitory computer-readable medium of claim 27, wherein the UE switches to the additional default resource bandwidth as the active bandwidth based at least in part on a default resource bandwidth order,
   wherein the timer expiry comprises an expiry of a first resource bandwidth inactivity timer associated with the initial resource bandwidth, and
   wherein the additional timer expiry comprises an expiry of a second resource bandwidth inactivity timer associated with the default resource bandwidth.

30. An apparatus for wireless communication, comprising:
   means for communicating using an initial resource bandwidth within a bandwidth part (BWP) as an active bandwidth, wherein the initial resource bandwidth comprises at least a first portion of the bandwidth part; and
   means for automatically switching, based at least in part on a timer expiry, to a default resource bandwidth within the BWP as the active bandwidth, wherein the default resource bandwidth comprises at least a second portion of the BWP.

* * * * *